United States Patent
Chen et al.

(10) Patent No.: US 11,614,876 B2
(45) Date of Patent: Mar. 28, 2023

(54) MEMORY DEVICE AND METHOD FOR ACCESSING MEMORY DEVICE WITH NAMESPACE MANAGEMENT

(71) Applicant: MACRONIX International Co., Ltd., Hsinchu (TW)

(72) Inventors: Chang-Hao Chen, Hsinchu (TW); Ting-Yu Liu, Hsinchu (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 0 days.

(21) Appl. No.: 17/408,177

(22) Filed: Aug. 20, 2021

(65) Prior Publication Data
US 2023/0054801 A1 Feb. 23, 2023

(51) Int. Cl.
*G06F 3/06* (2006.01)
*G06F 12/0804* (2016.01)
*G06F 12/1009* (2016.01)

(52) U.S. Cl.
CPC .......... *G06F 3/0644* (2013.01); *G06F 3/0604* (2013.01); *G06F 3/0659* (2013.01); *G06F 3/0679* (2013.01); *G06F 12/0804* (2013.01); *G06F 12/1009* (2013.01); *G06F 2212/1044* (2013.01)

(58) Field of Classification Search
CPC .... G06F 3/0644; G06F 3/0604; G06F 3/0659; G06F 3/0679; G06F 12/0804; G06F 12/1009; G06F 2212/1044
See application file for complete search history.

(56) References Cited

U.S. PATENT DOCUMENTS

| | | | |
|---|---|---|---|
| 10,095,701 B1 * | 10/2018 | Faibish | G06F 16/166 |
| 2013/0227201 A1 * | 8/2013 | Talagala | G06F 13/28 |
| | | | 711/103 |
| 2017/0351431 A1 * | 12/2017 | Dewitt | G06F 12/0238 |
| 2019/0227938 A1 * | 7/2019 | Gopalakrishnan | |
| | | | G06F 12/0862 |
| 2021/0240584 A1 * | 8/2021 | Pu | G06F 11/108 |

OTHER PUBLICATIONS

Ting-Yu Liu et al., "Memory Device and Method for Accessing Memory Device," Unpublished U.S. Appl. No. 17/323,829, filed May 18, 2021, The specification, claims, and the drawings of the unpublished pending U.S. application have been stored in the Image File Wrapper (IFW) system.

* cited by examiner

*Primary Examiner* — Sean D Rossiter
(74) *Attorney, Agent, or Firm* — J.C. Patents

(57) ABSTRACT

The invention provides a memory device including a memory array, an internal memory, and a processor. The memory array stores node mapping tables for access data in the memory array. The internal memory includes a namespace table and an index table The processor obtains a data access command from a host device to determine whether a data of the data access command contains one of the NSIDs, assigns the at least one internal NSID to the data of the data access command according to the data access command in response to the data of the data access command that does not contain the namespace identifier, and, the processor manages the data with the internal NSID by the namespace table and the index table.

25 Claims, 20 Drawing Sheets

(A)

(B)

MEMORY DEVICE AND METHOD FOR ACCESSING MEMORY DEVICE WITH NAMESPACE MANAGEMENT

BACKGROUND

Technical Field

The present disclosure relates to a memory device and a method for managing data with namespace table while the data may not contain a corresponding namespace identifier (NSID).

Description of Related Art

A host device requires multiple namespaces for different data usage and data access, and it may have opportunity to resize (enlarge or shrink) every namespace during device lifetime. Commands of namespace management are descripted in non-volatile memory (NVM) Express protocol or in the universal flash storage (UFS) interface protocol, such as "Create", "Modify", "Enlarge", Shrink", or "Delete". For example, In NVM Express protocol, a namespace is a quantity of non-volatile memory that may be formatted into logical blocks. The controller of the NVM may support multiple namespaces that are referenced using a namespace ID. In UFS interface protocol, a logical unit (similar as namespace) is an externally addressable, independent, processing entity that processes commands and performs task management functions.

The data accessed by the host device always have a corresponding namespace ID (NSID), but some types of data (i.e., data for booting or system use, such as, image data, firmware code, microcode ... etc.) will not be accessed by the host device, so these types of data does not have corresponding NSID for data access. Thus, the memory device accessed by the host device may need to manage these types of data without corresponding NSIDs by additional access method(s) or mapping method(s).

SUMMARY

The present invention provides a memory device and a method for accessing the memory device for managing data with namespace table while the data may not contain a corresponding NSID.

The memory device in the present invention includes a memory array, an internal memory, and a processor. The internal memory includes a namespace table and an index table. The namespace table includes a plurality of namespace identifiers (NSIDs) and at least one internal NSID. The processor is coupled to the memory array and the internal memory. The processor is configured to: obtaining a data access command from a host device to determine whether a data of the data access command contains one of the NSIDs; assigning the at least one internal NSID to the data of the data access command according to the data access command in response to the data of the data access command that does not contain the NSID; and, managing the data with the internal NSID by the namespace table and the index table.

The method for accessing the memory device in the present invention is applicable to the memory device including a memory array and an internal memory. The method includes following steps: obtaining a data access command from a host device to determine whether a data of the data access command contains one of the NSIDs; assigning the at least one internal NSID to the data of the data access command according to the data access command in response to the data of the data access command that does not contain the namespace identifier; and, managing the data with the internal NSID by the namespace table and the index table.

Based on the foregoing, the memory device and the method for accessing therefore in the embodiments of the present invention are configured to manage data with namespace table and corresponding index table. If the data of the data access command that does not contain the NISD, the processor of the memory device can assign an internal NSID to the data for management easily, and it may not create another access method or mapping method to handle data that does not contain the NISD (i.e., an image data, such as, a firmware code, a boot partition, a replay protected memory block (RPMB), or an out-of-order data compared to user data).

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Implementations of the present disclosure provide systems and methods for accessing data by managing data with namespace table while the data may not contain a corresponding namespace identifier (NSID). For instance, some data does not access by the host device, but the data may use for booting or updating the firmware of the memory device, such as, the image data or similar data. In one embodiment, the memory device may use additional access method(s) or mapping method(s) to manage these data. In one embodiment of the present disclosure, it may assign an internal NSID for the data without NSID for manage these data easily.

Figure 1:
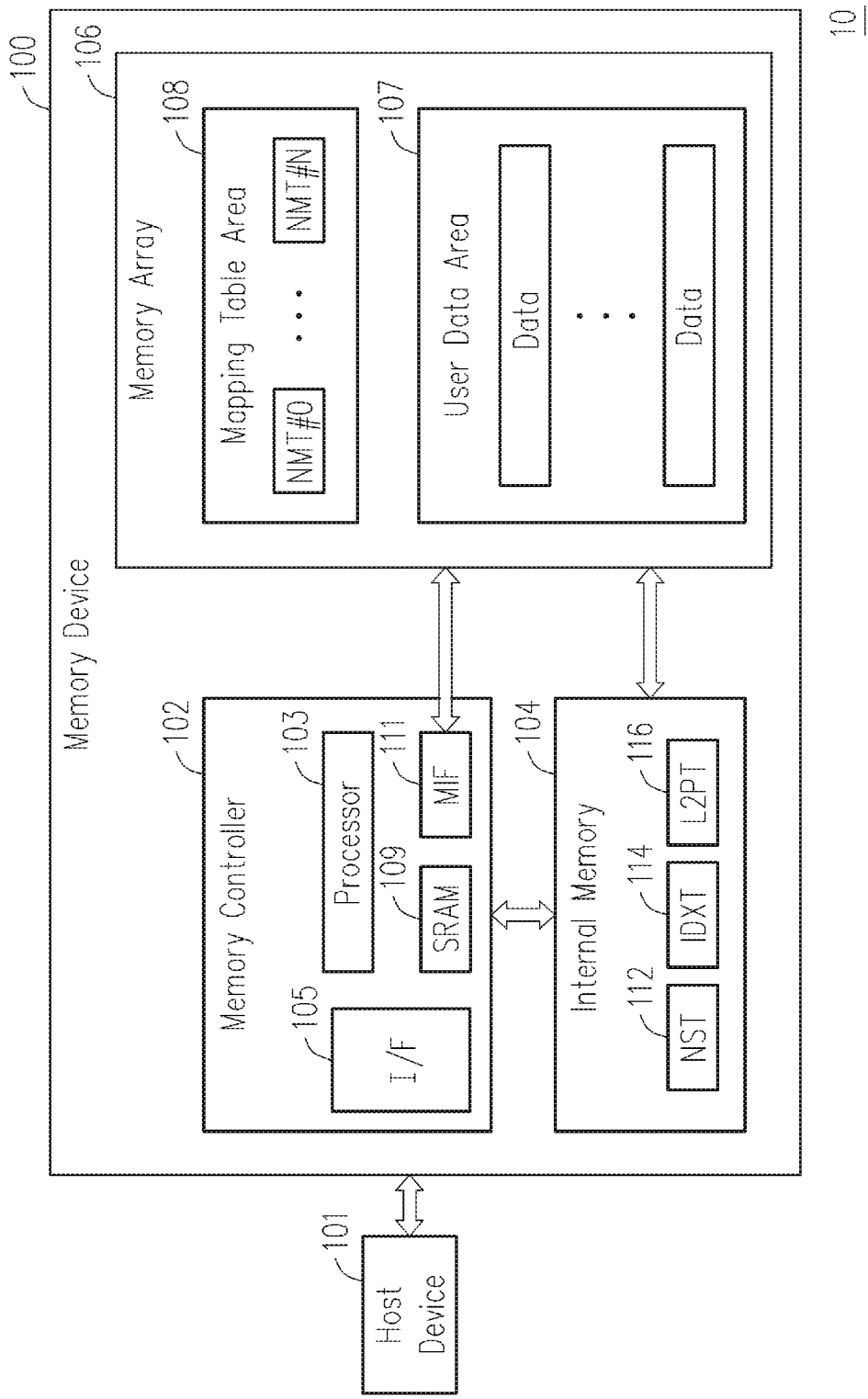
FIG. 1 is a block diagram of an electronic system with a host device and a memory device according to an embodiment of the present invention.

FIG. 1 is a block diagram of an electronic system 10 with a host device 101 and a memory device 100 according to an embodiment of the present invention. The electronic system 10 includes the host device 101 and the memory device 100. The memory device 100 includes a memory controller 102, an internal memory 104, and a memory array 106. The memory controller 102 includes a processor 103, a host interface (I/F) 105, a memory array interface (MIF) 111, and may further include a Static Random Access Memory (SRAM) 109. The host interface 105 is an interface for the memory controller 102 in communication with the host device 101. For example, through the host interface 105, the memory controller 102 can receive write or read commands and data from the host device 101 or transmit user data retrieved from the memory array 106 to the host device 101. The memory array interface (MIF) 111 is a interface for the memory controller 102 in communication with the memory array 106.

In some implementations, the memory device 100 is a storage device. For example, the memory device 100 can be an embedded multimedia card (eMMC), a secure digital (SD) card, a solid-state drive (SSD), or some other suitable storage. In some implementations, the memory device 100 is implemented in a smart watch, a digital camera or a media player. In some implementations, the memory device 100 is a client device that is coupled to a host device 101. For example, the memory device 100 is an SD card in a host device 101, such as a digital camera, a media player, a laptop or a personal computing device . . . etc.

The memory controller 102 is a general-purpose microprocessor, or an application-specific microcontroller. In some implementations, the memory controller 102 is a memory controller for the memory device 100. The processor 103 is coupled to the memory array 106 and the internal memory 104. The processor 103 is configured to execute commands and process data. The commands include firmware commands and/or other program commands that are stored as firmware code and/or other program code, respectively, in a secondary memory. The data includes program data corresponding to the firmware and/or other programs executed by the processor, among other suitable data. In some implementations, the processor 103 is a general-purpose microprocessor, or an application-specific microcontroller. The processor 103 is also referred to as a central processing unit (CPU). In some embodiment, the processor 103 may not only handle the algorithms of table caches and memory array, but also mange other flash translation layer (FTL) algorithm for assisting a memory array conversion of access addresses.

The processor 103 accesses commands and data from the internal memory 104. In some implementations, the internal memory 104 is a Dynamic Random Access Memory (DRAM). In some implementations, the internal memory 104 is a cache memory. The internal memory 104 stores data and tables that are requested by the processor 103 during runtime. In the embodiment, the internal memory 104 includes a namespace table (NST) 112, an index table (IDXT) 114, and a logic-to-physical table (L2PT) 116. The internal memory 104 further includes a mapping table area for storing the NST 112, the IDXT 114, and the L2PT 116. The SRAM 109 is operable to store instruction codes or commands which are executed by processor 103.

The memory controller 102 transfers the instruction code, the command, and/or the data from the memory array 106 to the SRAM 109. In some implementations, the memory array 106 is a non-volatile memory (NVM) array that is configured for long-term storage of commands and/or data, e.g., a NAND flash memory device, or some other suitable non-volatile memory device, and the memory device 100 is a NVM system. In implementations where the memory array 106 is a flash memory array with a NAND type, a NOR type, or an AND type, the memory device 100 is a flash memory device, e.g., a solid-state drive (SSD), and the memory controller 102 is a NAND flash controller.

The memory array 106 in the embodiment of the present invention stores a plurality of node mapping tables (i.e., NMT #0-NMT #N in FIG. 1) for accessing data in the memory array 106, and further stores a plurality of data. In some implementations, the memory array 106 includes a user data area 107 for storing a plurality of user data and a mapping table area 108 for storing the mapping tables NMT #0-NMT #N.

Figure 2:
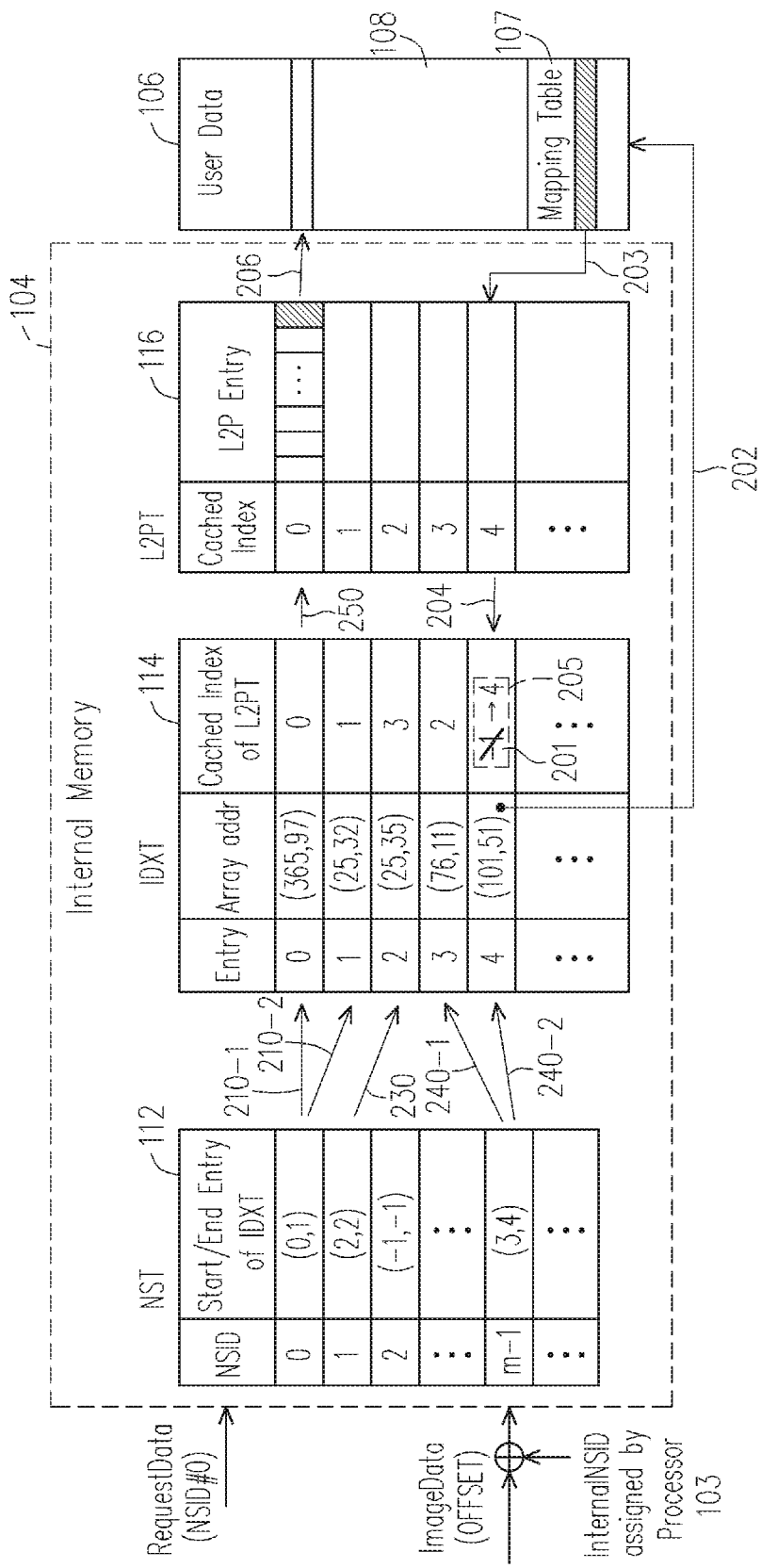
FIG. 2 is a schematic diagram of the namespace table (NST), the index table (IDXT), and a logic-to-physical table (L2PT) in the internal memory and the memory array according to an embodiment of the present invention.

FIG. 2 is a schematic diagram of the namespace table (NST) 112, the index table (IDXT) 114, and a logic-to-physical table (L2PT) 116 in the internal memory 104 and the memory array 106 according to an embodiment of the present invention. In the embodiment of FIG. 2, the NST 112 includes a plurality of namespace identifiers (NSIDs) and at least one internal NSID (i.e., "m-1" of NSID) in first column, and the NST 112 further includes a start entry and an end entry of the IDXT 114 shown as ("start entry", "end entry") in second column for each NSIDs and the at least one internal NSID. For example, in the NST 112, NSID "0" in the first column has a corresponding start entry and a corresponding end entry (0, 1) of the IDXT 114, and it means NSID "0" in the NST 112 points to the entries of the IDXT 114 from "0" (shown as the arrow 210-1) to "1" (shown as the arrow 210-2); NSID "1" in the first column has a corresponding start entry and a corresponding end entry (2, 2) of the IDXT 114, and it means NSID "1" in the NST 112 points to the entry "2" of the IDXT 114 (shown as the arrow 230); NSID "2" in the first column has a corresponding start entry and a corresponding end entry (−1, −1) of the IDXT 114, and it means NSID "2" in the invalid state for unused; an internal NSID "m-1" in the first column has a corresponding start entry and a corresponding end entry (3, 4) of the IDXT 114, and it means the internal NSID "m-1" in the NST 112 points to the entries of the IDXT 114 from "3" (shown as the arrow 240-1) to "4" (shown as the arrow 240-2). In other words, the NISD "0"-"2" and the internal NSID internalNSID "m-1" have the same meaning in the NST 112.

The IDXT 114 in FIG. 2 includes entries in a first column (0-4 for example), addresses of the memory array ("Array addr" in FIG. 2) for each entry in a second column, and cached indexes of the L2PT 116 for each entry in a third column. For example, the entry "0", "1", "2", "3", and "4" have corresponding addresses of the memory array (365, 97), (25, 32), (25, 35), (76, 11), and (101, 51), respectively. The entry "0" of the IDXT 114 has a corresponding cached index "0" of the L2PT 116 as shown the arrow 250. And, for example, at first, the entry "4" of the IDXT 114 has a corresponding cached index "−1" of the L2PT 116 as shown in mark 201, it means that the mapping related to the entry "4" does not cached by the L2PT 116, so that the processor may load the mapping from the memory array 106 (shown as the arrow 202) with the address of the memory array (101, 51) in the IDXT 114 to a space of the cached index "4" in the L2PT 116 (shown as the arrow 203) from mapping table 107. And, the cached index of the L2PT 116 in the IDXT 114 is change from "−1" (invalid state) to "4" for recording the space of the cached index "4" in the L2PT 116. The L2PT 116 includes the cached indexes in a first column and the logic-to-physical (L2P) entries for each of the cached indexes in a second column. For example, in the L2PT 116, cached index "0" may have 1024 L2P entries. Each L2P entry in the L2PT 116 points to a space of the user data 108 (shown as the arrow 206).

In the process of data access between the host device 101 and the memory device 100 in FIG. 1, many data access commands from the host 101 have the corresponding NSIDs for access the user data in the user data area 107 of the memory array 108. But, in some cases, some out-of-order data in specific data access commands do not contain the corresponding NSID. These out-of-order data may not use by the host device, but the memory device has the opportunity for using these out-of-order data for updating firmware, booting the memory device, backing up some data . . . etc. For example, the data access command "ImageData" in FIG. 2 has an image data with an offset value OFFSET, but the data access command "ImageData" do not contain the corresponding NSID. The OFFSET means the offset value of the image data. Thus, the memory device of the embodiment assigns the internal NSID to these out-of-order data without corresponding NSIDs by the processor, and manages these out-of-order data through the assigned internal NSID easily. In other words, the out-of-order data of the data access command that does not contain the NSID is the image data for the memory device. The image data may be one of a firmware code, a boot partition, a replay protected memory block (RPMB), and an out-of-order data compared to user data of the memory array.

For example, according to the embodiment of FIG. 2, the NSID "0" (i.e., NISD #0) and the NSID "1" (i.e., NISD #1) are external namespaces created by the host device 101. The NSID "m-1" (i.e., NISD #m-1) is an internal namespace created by the processor 103 of the memory device 100. The NSID "2" (i.e., NISD #2) is an unallocated namespace.

Figure 3:
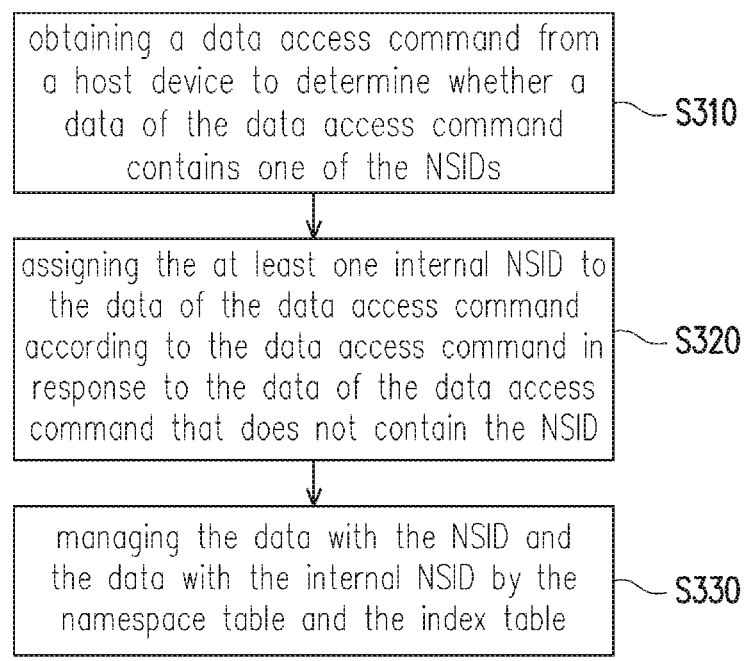
FIG. 3 is a flow chart illustrating a method for accessing the memory device according to an embodiment of the present invention.

FIG. 3 is a flow chart illustrating a method for accessing the memory device according to an embodiment of the present invention. Referring to FIG. 1 to FIG. 3, in step S310 of FIG. 3, the memory controller 102 of the memory device 100 obtains the data access command from the host device 101 to determine whether a data of the data access command contains one of the NSIDs. In step S320, the memory controller 102 of the memory device 100 assigns the at least one internal NSID (i.e., the internal NSID "m-1") to the data of the data access command according to the data access command in response to the data of the data access command that does not contain the NSID. And, in step S330, the memory controller 102 can manage the data with the NSID and the data with the internal NSID by the NST 112 and the IDXT 114. In other words, if the data of the data access command is not one of the user data accessed by the host device 101 (referring as the out-of-order data), the memory device 100 needs to manage these out-of-order data for assigning corresponding internal NSIDs to these out-of-order data. In the embodiment, the memory device 100 records relationship between the data access command of the out-of-order data and the corresponding internal NSIDs for managing these out-of-order data by identifying the type of the data access command with the out-of-order data. In other words, if the host device 101 uses the data access command with the out-of-order data, the memory controller 102 can find the corresponding internal NSIDs for managing these out-of-order data according to the type of the data access command.

For managing these out-of-order data with the assigned internal NSIDs, the processor 103 of the memory controller 102 can perform some instructions for "NSID Create", "NSID Enlarge", "NSID Narrow", "NSID Delete", "Write operation of User data", "Write operation of Image data", "Read operation", "Rebuild L2PT by data" . . . etc., and steps of the instructions will described below as examples.

Figure 4A:
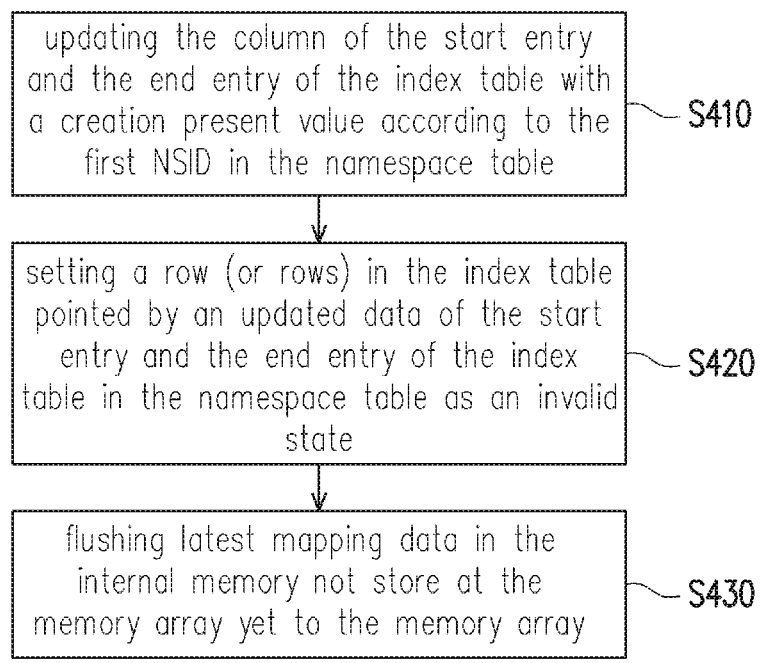
FIG. 4A and FIG. 4B are a flow chart and a schematic diagram for instruction "NSID Create" of the memory device according to an embodiment of the present invention respectively.
Figure 4B:
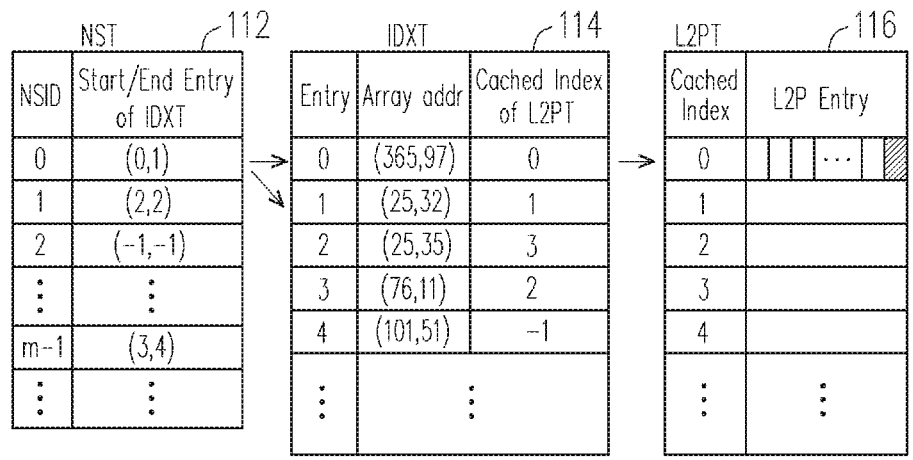
Figure 4B:
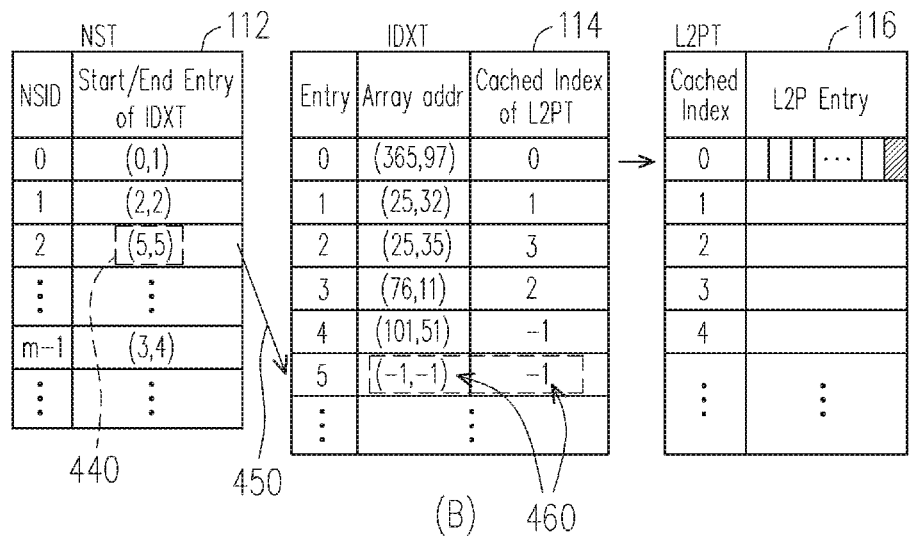

FIG. 4A and FIG. 4B are a flow chart and a schematic diagram for instruction "NSID Create" of the memory device according to an embodiment of the present invention respectively. In FIG. 4A and FIG. 4B, the processor of the memory controller executes the data access command for creating a first NSID ("NSID Create") as follows. For example, in FIG. 4B, the creation preset value of "NSID Create" is set as "2" to create NSID "2" by command request from the host device 101 of FIG. 1. In step S410, the processor updates the start entry and the end entry of the IDXT 114 from (−1, −1) in part (A) of FIG. 4B to (5, 5) in part (B) of FIG. 4B (shown as mark 440) in the first column with the creation preset value ("2") according to the first NSID "2" in the NST 112. And, in step S420, the processor sets a row (or rows) in the IDXT 114 (i.e., a row of Entry "5" in the IDXT 114) pointed by an updated data of the start entry and the end entry of the IDXT 114 (i.e., a row of Entry "5" in the IDXT 114) in the NST 112 as an invalid state. The invalid state of the row of Entry "5" in the IDXT 114 is that the address of the memory array is set as (−1, −1) and the cached index of L2PT 116 is set as −1 (shown as mark 460). In step S430, the processor flushes latest mapping data in the internal memory 104 not store at the memory array 106 yet to the memory array 109.

Figure 5A:
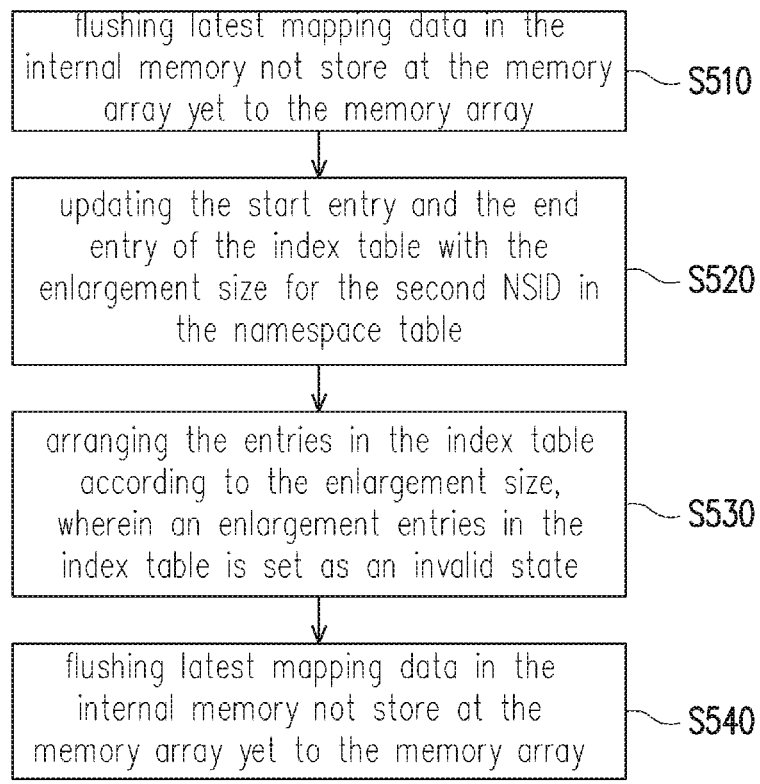
FIG. 5A and FIG. 5B are a flow chart and a schematic diagram for instruction "NSID Enlarge" of the memory device according to an embodiment of the present invention respectively.
Figure 5B:
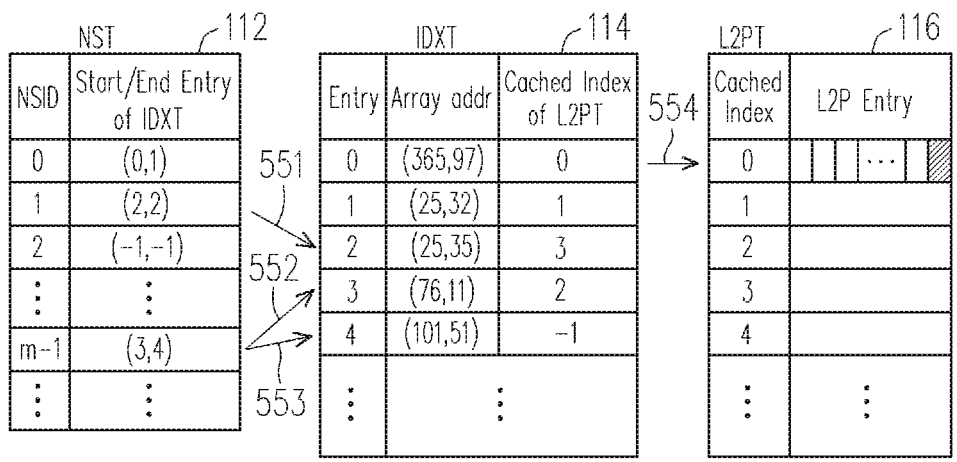
Figure 5B:
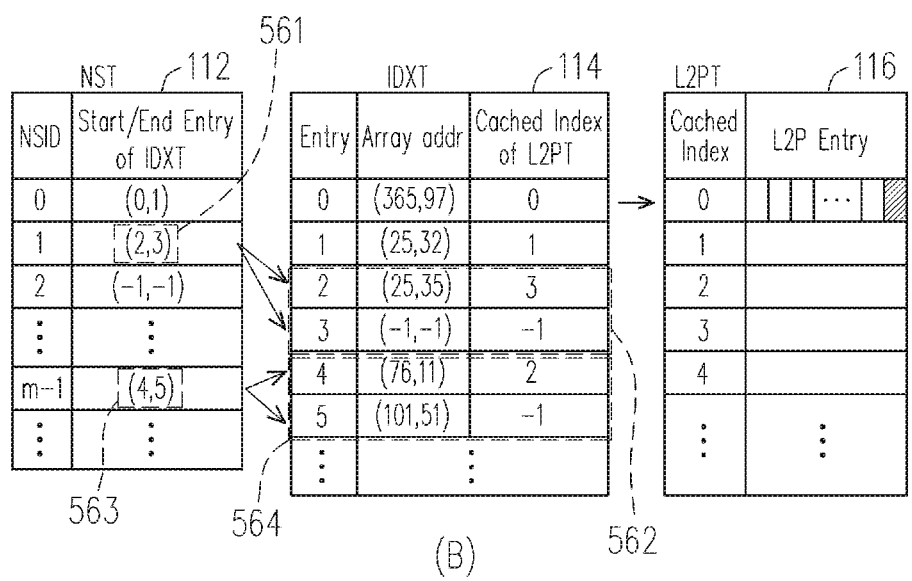

FIG. 5A and FIG. 5B are a flow chart and a schematic diagram for instruction "NSID Enlarge" of the memory device according to an embodiment of the present invention respectively. In FIG. 5A and FIG. 5B, the processor of the memory controller executes the data access command for enlarging a second NSID ("NSID Enlarge") as follows. For example, in FIG. 5B, the second NSID is "1", and the enlargement size is "2" from original "1" set by command request from the host device 101 of FIG. 1. The arrow 551 is pointed from the NSID "1" in the NST 112 to the entry "2" in the IDXT 114(start entry, end entry) (2, 2), the arrows 552 and 553 are pointed from the internal NSID "m-1" to the entry "3" and "4" respectively in the IDXT 114 according to (start entry, end entry) (3, 4).

In step S510, the processor flushes latest mapping data in the internal memory 104 not store at the memory array 106 yet to the memory array 109. In step S520, the processor updates the start entry and the end entry of the IDXT 114 with the enlargement size "2" for the preset NSID "1" in the NST 112. The enlargement size "2" is predetermined by the memory controller and is larger than a size between the original entry and the original end entry of the IDXT 114. The mark 561 of part(B) in FIG. 5B presents the (start entry, end entry) is updated as (2, 3) because of the enlargement size "2", and the mark 563 of part(B) in FIG. 5B presents the (start entry, end entry) is updated as (4, 5) because the change of the NISD "2". In step 530, the processor arranges the entries in the index table according to the enlargement size "2". For example, the entries "2" to "3" in IDXT 114 (shown as mark 562) in part (B) of FIG. 5B are re-arranged from entries "2" in part (A) of FIG. 5B for the NSID "1", and the entries "4" to "5" in IDXT 114 (shown as mark 564) in part (B) of FIG. 5B are re-arranged from entries "3" to "4" in part (A) of FIG. 5B for the NSID "m-1". The enlargement entry (i.e., entry "3") in the IDXT 114 is set as the invalid state (may referred as the mark 460 in FIG. 4B). In step 540, the processor flushes the latest mapping data in the internal memory 104 not store at the memory array yet to the memory array 106 again.

Figure 6A:
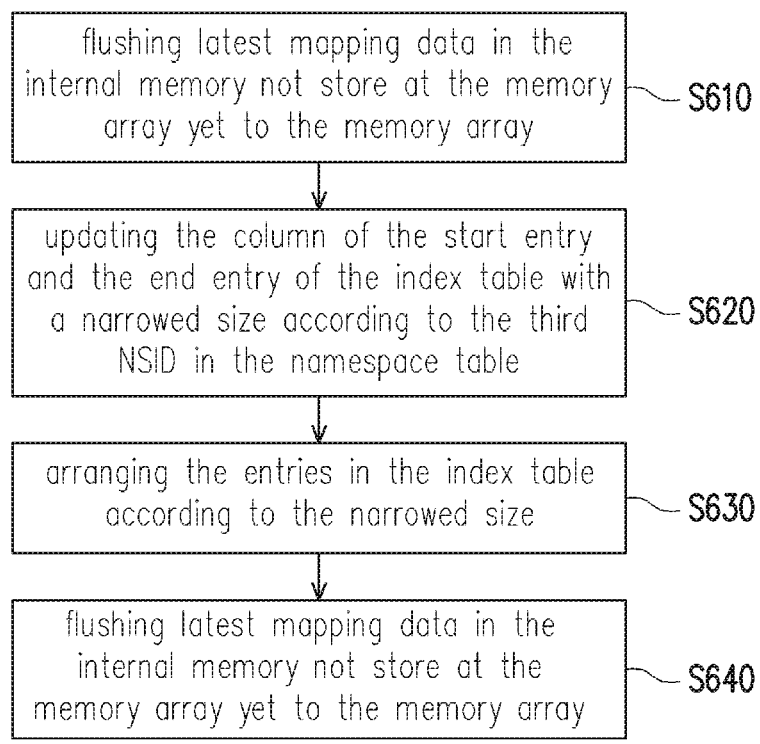
FIG. 6A and FIG. 6B are a flow chart and a schematic diagram for instruction "NSID Narrow" of the memory device according to an embodiment of the present invention respectively.
Figure 6B:
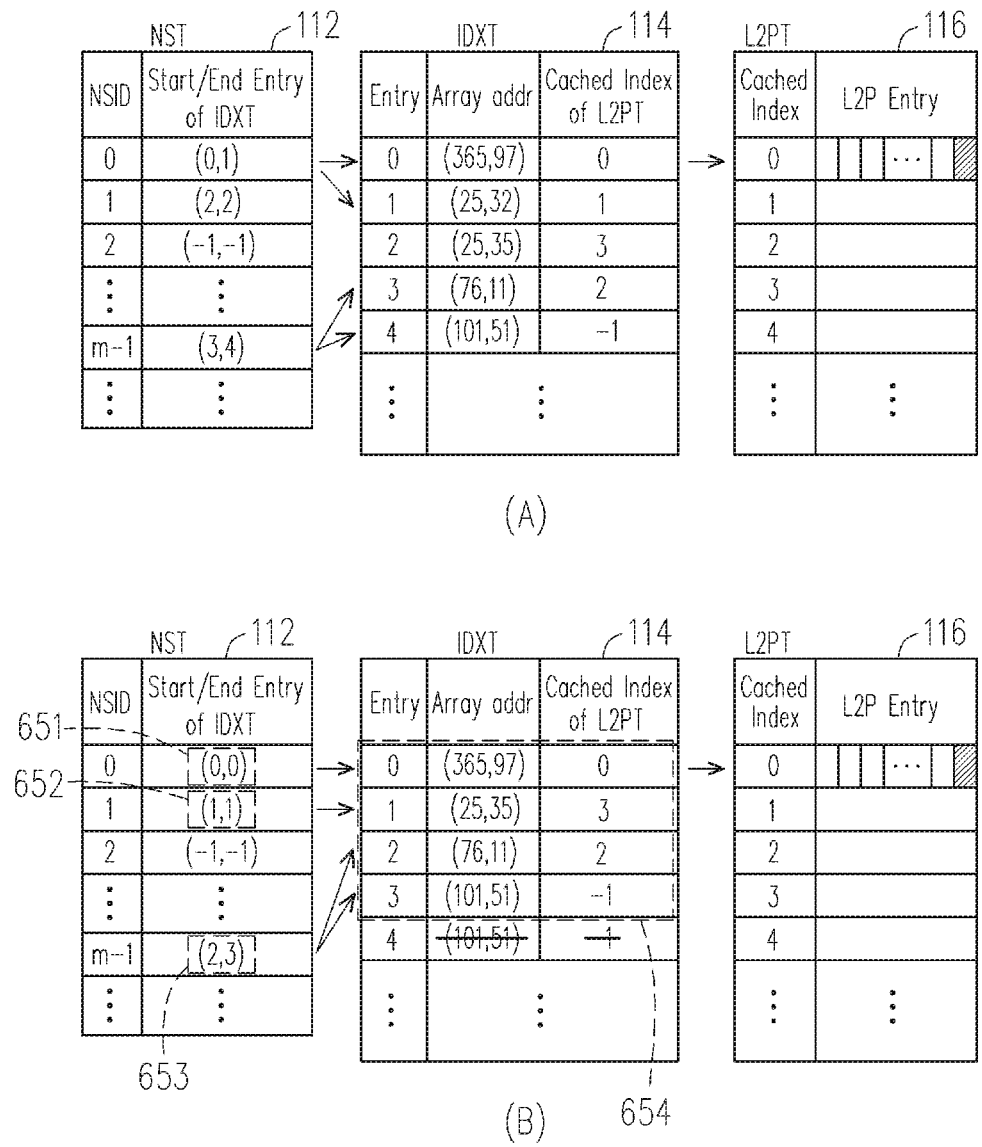

FIG. 6A and FIG. 6B are a flow chart and a schematic diagram for instruction "NSID Narrow" of the memory device according to an embodiment of the present invention respectively. In FIG. 6A and FIG. 6B, the processor of the memory controller executes the data access command for narrowing a third NSID ("NSID Narrow") as follows. For example, in FIG. 6B, the third NSID is "0", and the narrowed size is "1" from original "2" (because of (0, 1) in part (A) of FIG. 6B) set by command request from the host device 101 of FIG. 1.

In step S610, the processor flushes the latest mapping data in the internal memory 104 not store at the memory array yet to the memory array 106. In step S620, the processor updates the start entry and the end entry of the IDXT 114 (i.e., (0, 0) of mark 651 in part (B) of FIG. 6B) with the narrowed size "1" according to the third NSID "0" in the NST 112, and the processor updates all of the start entry and the end entry of the IDXT 114 (i.e., (1, 1) of mark 652 in part (B) of FIG. 6B). The narrowed size "1" is predetermined by the memory controller, and the narrowed size"1" is smaller than a size between the original entry and the original end entry (0, 1) of the IDXT 112. In step S630, the processor arranges the entries in the IDXT 114 according to the narrowed size "1". For example, the entry "1" of IDXT 114 in part (A) of FIG. 6B has been deleted, and the original entries "0", "2"-"4" of IDXT 114 in part (A) of FIG. 6B has been moved to the entries "0"-"3" of IDXT 114 in part (B) of FIG. 6B shown as mark 654. Then, in step S640, the processor flushes flushing latest mapping data in the internal memory not store at the memory array yet to the memory array again.

Figure 7A:
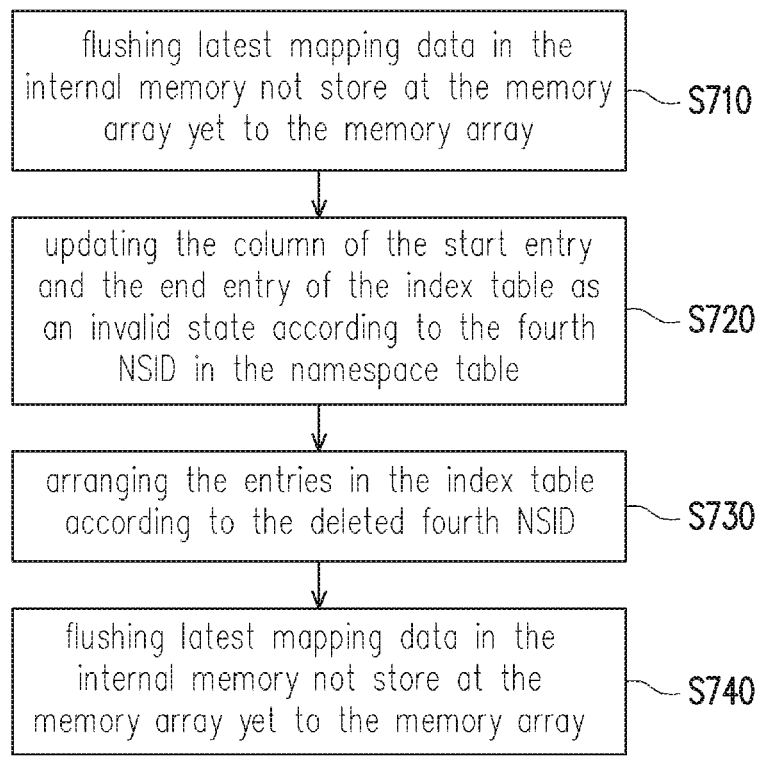
FIG. 7A and FIG. 7B are a flow chart and a schematic diagram for instruction "NSID Delete" of the memory device according to an embodiment of the present invention respectively.
Figure 7B:
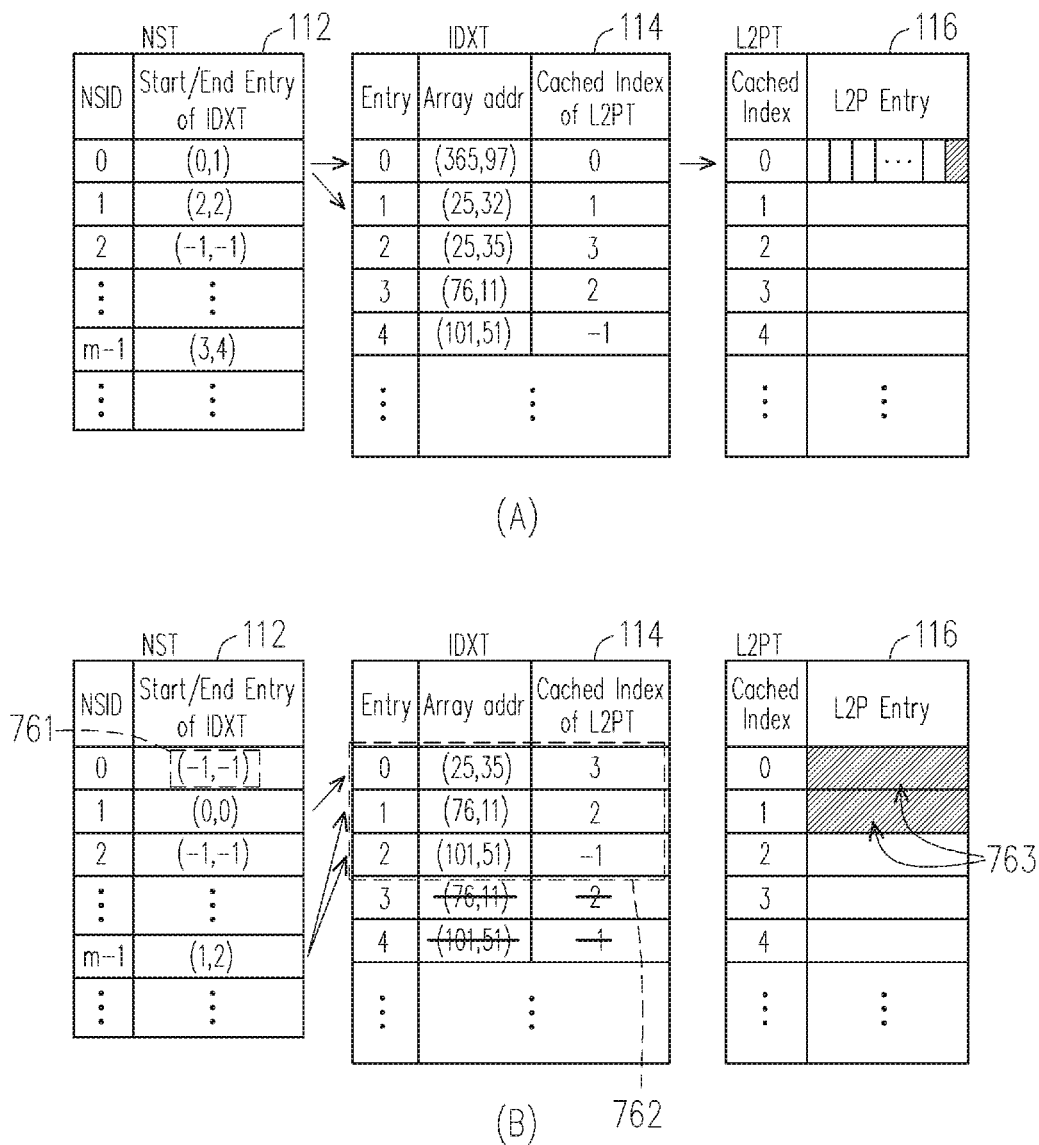

FIG. 7A and FIG. 7B are a flow chart and a schematic diagram for instruction "NSID Delete" of the memory device according to an embodiment of the present invention respectively. In FIG. 7A and FIG. 7B, the processor of the memory controller executes the data access command for deleting a fourth NSID ("NSID Delete") as follows. For example, in FIG. 7B, the preset NSID is "0" set by command request from the host device 101 of FIG. 1.

In step S710, the processor flushes the latest mapping data in the internal memory 104 not store at the memory array yet to the memory array 106. In step S720, the processor updates the start entry and the end entry of the IDXT 114 as the invalid state (i.e., (−1, −1) of mark 761 in part (B) of FIG. 7B) according to the fourth NSID "0" in the NST 112, and the processor updates all of the start entry and the end entry of the IDXT 114 ((i.e., (0, 0) of NSID "1", (1, 2) of NSID "m-1" in part (B) of FIG. 7B). In step S730, the processor arranges the entries in the IDXT 114 according to the deleted fourth NSID "0". For example, the entries "0" and "1" of IDXT 114 in part (A) of FIG. 7B related to the NSID "0" has been deleted in part (B) of FIG. 7B, and the original entries "2"-"4" of IDXT 114 in part (A) of FIG. 7B has been moved to the entries "0"-"2" of IDXT 114 in part (B) of FIG. 7B shown as mark 762. The L2P entries in the row of cached index "0" and "1" in L2PT 116 pointed by the arrow 763 originally belongs to the NSID "0" in part (A) of FIG. 7B, but the NSID "0" has been deleted in part (B) of FIG. 7B. Thus, the L2P entries pointed by the arrow 763 in part (B) of FIG. 7B are no more used with operations of data mapping according to the deleted NSID "0". Then, in step S740, the processor flushes the latest mapping data in the internal memory 104 not store at the memory array yet to the memory array 106 again. Based on the arrange operations in IDXT 114 by instruction "NSID Delete, the operations for the instruction "NSID Create" have less time overhead because there is no fragment problem need to handle in index table.

Figure 8A:
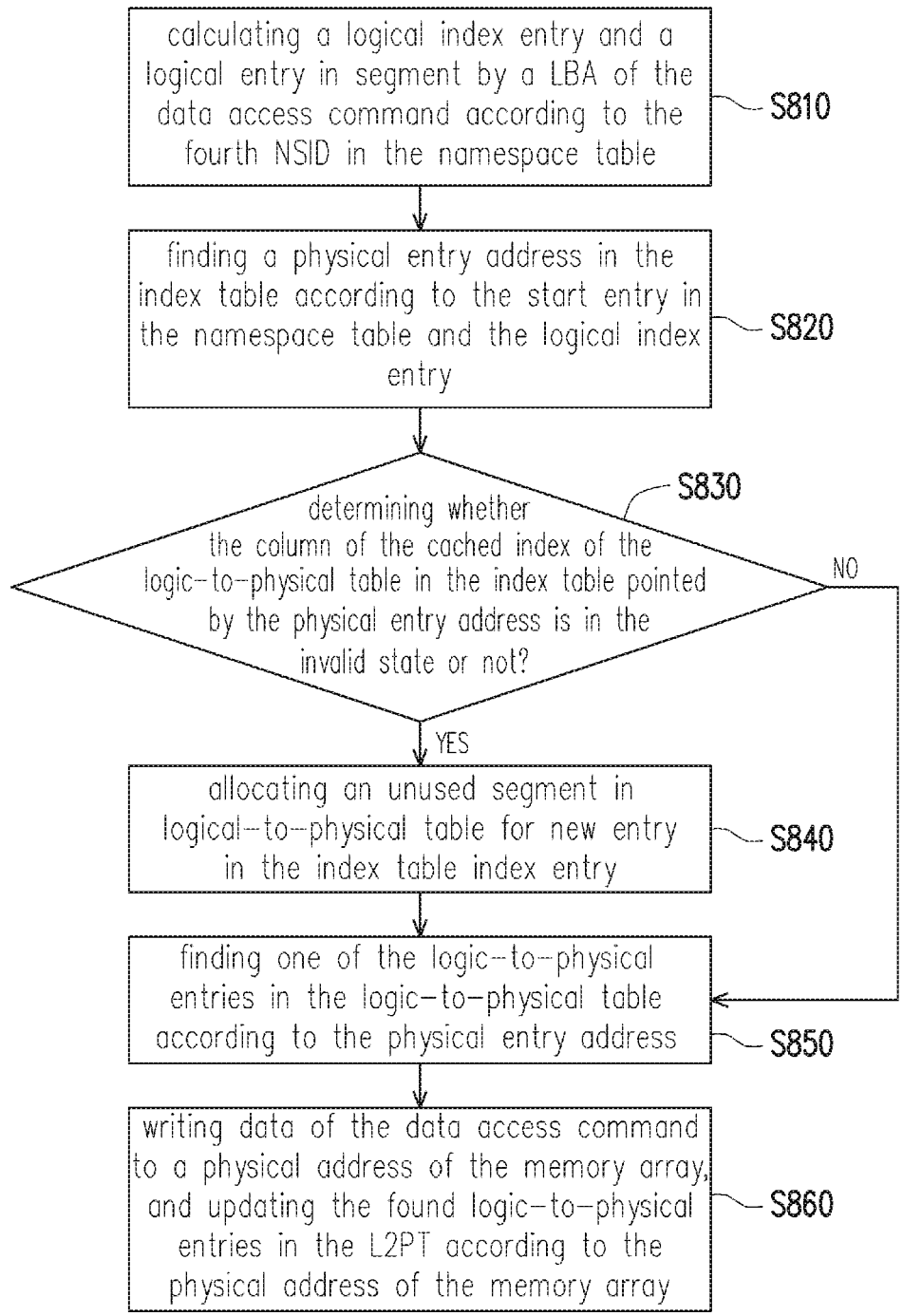
FIG. 8A and FIG. 8B are a flow chart and a schematic diagram for instruction "Write operation of User data" of the memory device according to an embodiment of the present invention respectively.
Figure 8B:
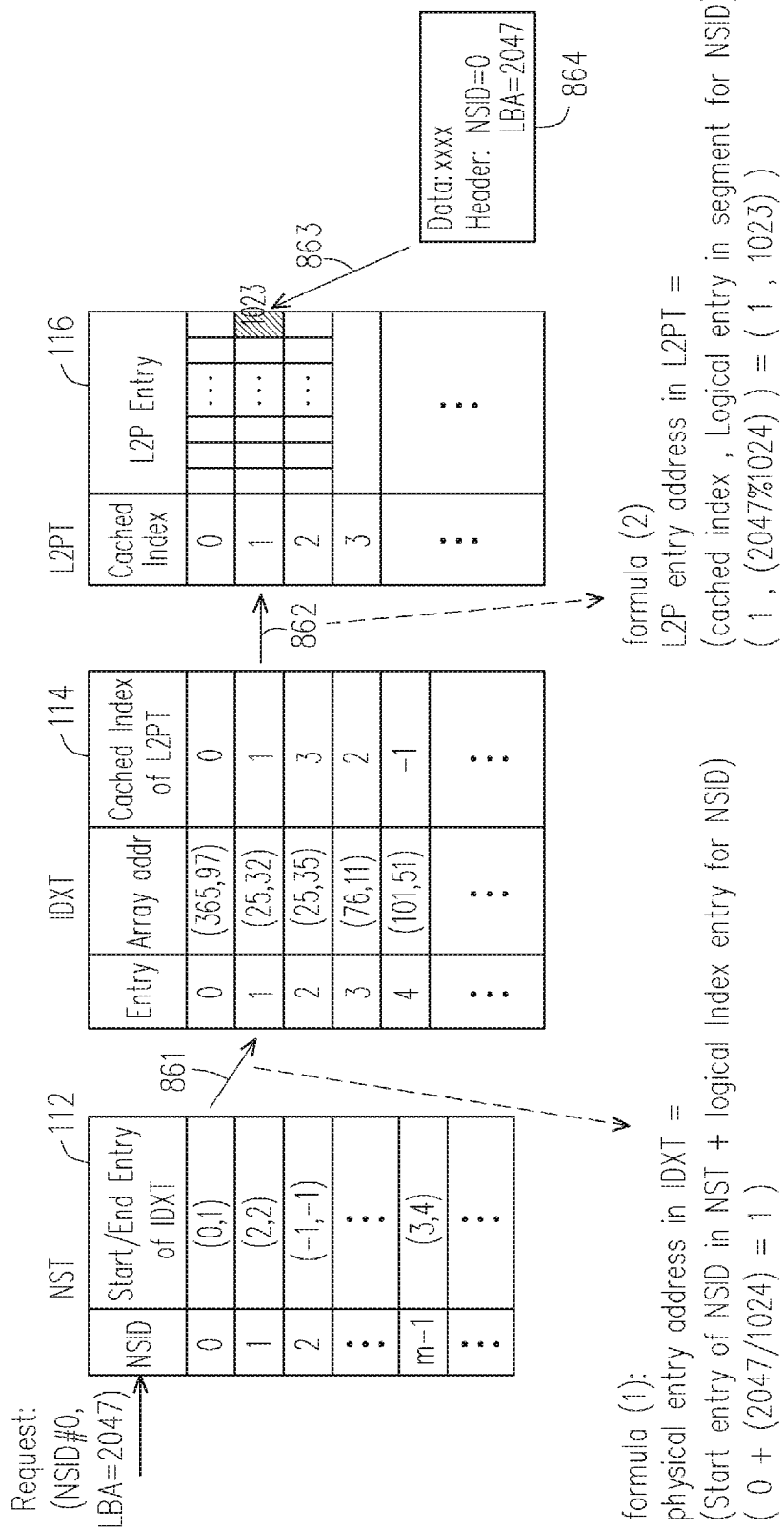

FIG. 8A and FIG. 8B are a flow chart and a schematic diagram for instruction "Write operation of User data" of the memory device according to an embodiment of the present invention respectively. In FIG. 8A and FIG. 8B, the processor of the memory controller executes the data access command "Request" for writing a user data to a fifth NSID (i.e., the NSID=0") and a logical block address (LBA) (i.e., the LBA=2047) as follows. For example, in FIG. 8B, the fifth NSID "0" is set by command request from the host device 101 of FIG. 1. In the embodiment, the processor uses the NSID "0" for write operation of the user data according to the data access command at first.

In step S810, the processor calculates a logical index entry and a logical entry in segment by the LBA of the data access command according to the fourth NSID "0" in the namespace table NST 112. In the embodiment, the logical entry of NSID "0" is "0", and the logical index entry of NSID "0" is a quotient "1" for the LBA "2047" divided by "1024". The "1024" is a number of the L2P entries in a row in the L2PT 116. In step 820, the processor finds a physical entry address in the IDXT 114 according to the start entry "0" of the NSID "0" in the NST 112 and the logical index entry "1", shown as the formula (1) of FIG. 8B. The formula (1) is shown that, the physical entry address in IDXT 114 is a number "1" for the sum of the start entry "0" of IDXT 114 and the logical index entry "1".

In step S830, the processor determines whether the column of the cached index of the L2PT 112 in the IDXT 114 pointed by the physical entry address "1" is in the invalid state or not. If the column of the cached index of the L2PT 112 in the IDXT 114 pointed by the physical entry address "1" is in the invalid state "−1" (S830 is YES), then into the step S840 from step S830, the processor allocates an unused segment on L2PT 116 for new entry in the IDXT 114 index entry. Otherwise, if the column of the cached index of the L2PT 112 "1" in the IDXT 114 pointed by the physical entry address "1" is not in the invalid state (S830 is NO) (shown as arrow 861), then into the step S850 from step S830, the processor finds at least one of the logical-to-physical entries in the L2PT 116 (shown as arrow 862) according to the physical entry address "1" in response to the column of the cached index "1" of the L2PT 116 in the IDXT 114 pointed by the physical entry address "1" is not in the invalid state. In the embodiments, assuming that the L2P segment contains 1024 L2P entries, the L2P entry address in L2PT 116 is in the row of the cached index "1", and the logical entry in segment for NSID "1023" of the row of the cached index "1" is a residue "1023" for the LBA "2047" divided by "1024", which shown as formula (2) in FIG. 8B.

After finding the L2P entries in the L2PT 116 (shown as arrow 862) in step S850, the processor performs step S860 for writing the user data of the data access command to a physical address of the memory array 106 (shown as a mark 864), and updating addresses of written memory array to the found logic-to-physical (L2P) entries in the L2PT 116 (shown as arrow 862) in step S850 according to the physical address of the memory array 106. In other words, in step S860, the processor writes the user data to the physical address of the memory array 106 shown as the mark 864, and writes the physical address of the memory array 106 to the L2P entries in the L2PT 116 found by the step S850 to update the L2P entries in the L2PT 116 shown as the arrow 862. In mark 864, the data is shown as "XXXX", the header of data has the corresponding NSID ("0") and the LBA ("2047").

Figure 9A:
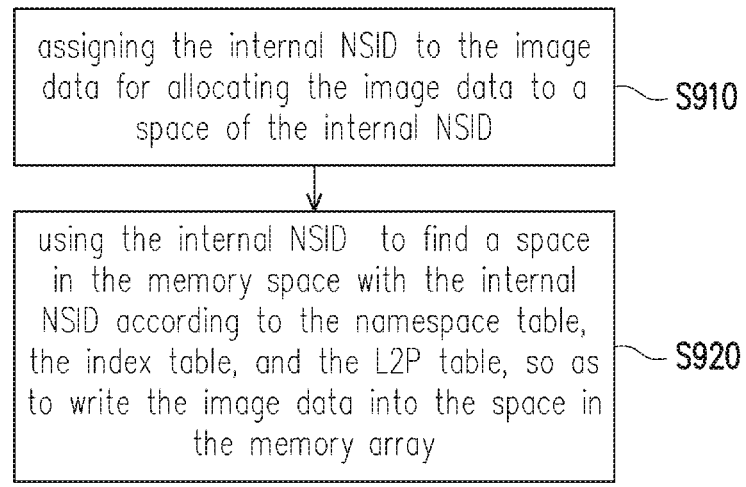
FIG. 9A, FIG. 9B, and FIG. 9C are a flow chart, one schematic diagram and the other one schematic diagram for instruction "Write operation of Image data" of the memory device according to an embodiment of the present invention respectively.
Figure 9B:
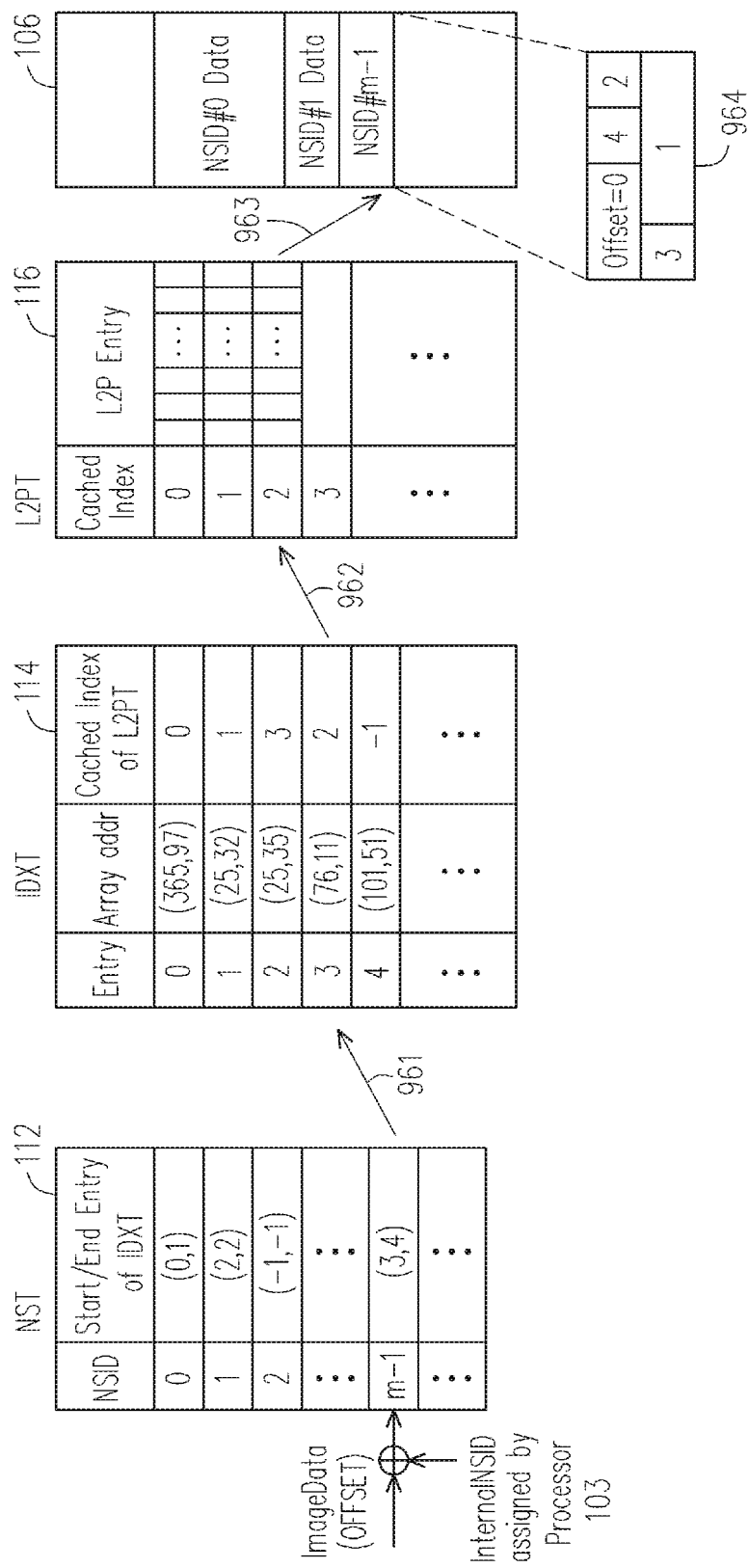
Figure 9C:
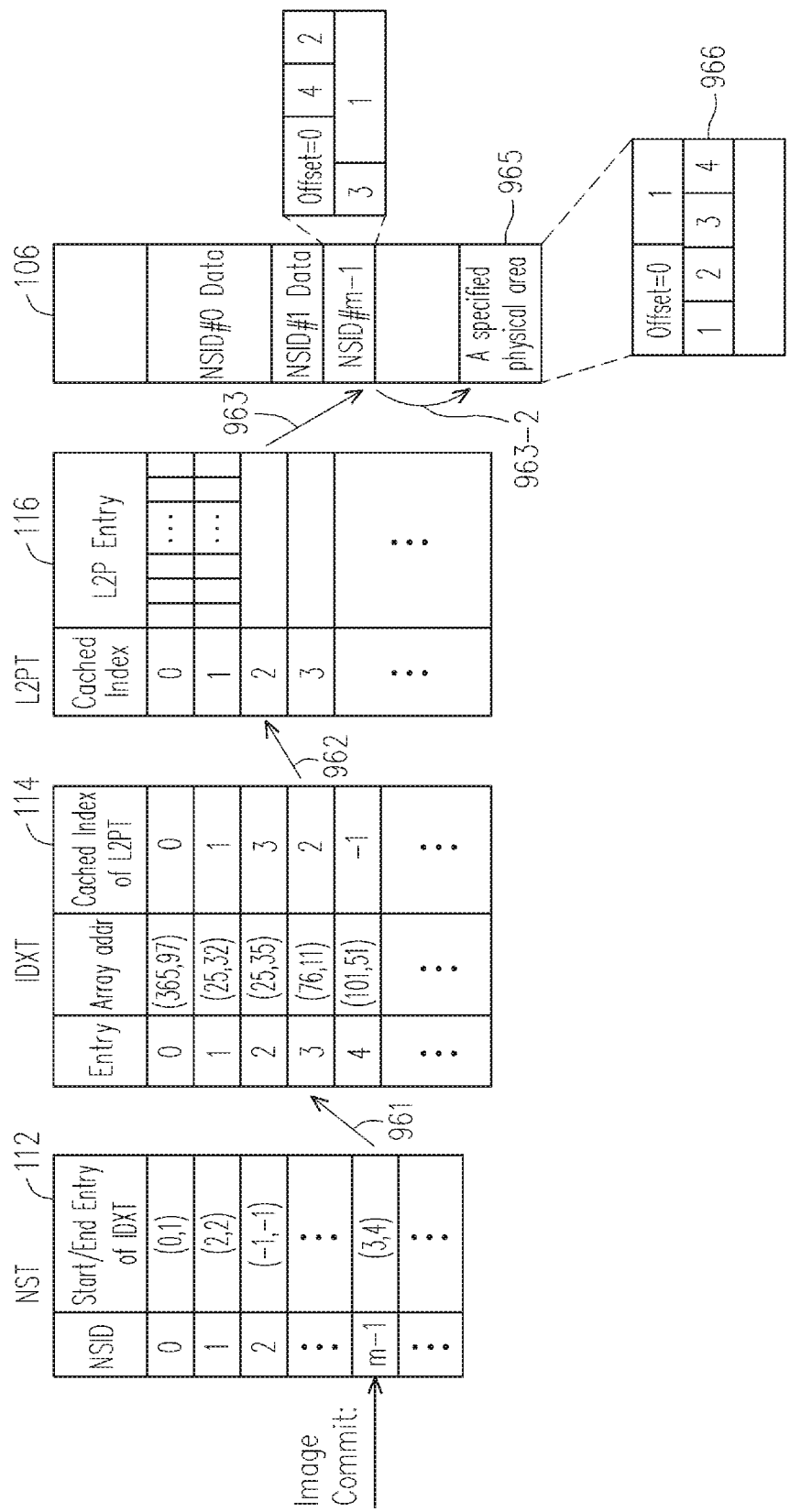

FIG. 9A, FIG. 9B, and FIG. 9C are a flow chart, one schematic diagram and the other one schematic diagram for instruction "Write operation of Image data" of the memory device according to an embodiment of the present invention respectively. In FIG. 9A, FIG. 9B, and FIG. 9C, the processor of the memory controller executes the data access command for writing an image data, but the data access command of the image data does not contain the corresponding NSID with the image data. Thus, in step S910, the processor assigns the internal NSID (i.e., the internal NSID "m-1") to the image data for allocating the image data to a space of the internal NSID. The internal NSID "m-1" is assigned by the processor according to the data access command. For example, the processor may make a table with the internal NSIDs and lots kind of data access commands of image data, and the processor looks up the table with one data access command for assigning a present internal NSID to the image data at first for accessing the image data easily. In other embodiments, the processor may set relationship of lots of the internal NSIDs and lots of the data access commands for assigning a present internal NSID to the image data.

In step S920, the processor uses the internal NSID "m-1" to find the space in the memory space with the internal NSID "m-1" according to the NST 112, the IDXT 114 and the L2PT 116, so as to write the image data into the space in the memory array by NSID #m-1 in FIG. 9B. For example, in FIG. 9B, the processor finds the start/end entry of the IDXT in NST 112 as (3, 4), and thus finds the row of the start entry "3" of the IDXT 114 shown as arrow 961. And, the processor finds the cached index "2" in L2PT 116 according to the column of cached index "2" of L2P in the IDXT 114 shown as arrow 962, thus writes or access the image data into NSID #m-1 of the memory array shown as arrow 963. The data structure of the NSID #m-1 is shown as the mark 964.

In the embodiments, the image data needs a commit command "Image Commit" from the host device 101 of FIG. 1 to admit that the image data is a valid data, so that the processor uses the NSID #m-1 of the memory array 106 as one type for accessing the image data shown as FIG. 9C. For the other type for accessing the image data in the embodiments of step S920 in FIG. 9A and FIG. 9C, the processor further copy the image data to the specified physical area 965 shown by arrow 963-2 of FIG. 9C, and the processor writes or accesses the image data by using a physical address of the specified physical area. In other words of arrow 963-2, the image data is moved from NSID #m-1 to the physical address of the specified physical area 965, so as to re-order the image data by offset for committing the image data. In FIG. 9C, the image data/image table information on NSID #m-1 will become invalid and no more use after committing the image data. And, after committing the image data, the image in the specified physical area 965 cannot be changed unless using the data access command with the image data for newly writing the image data.

Figure 10A:
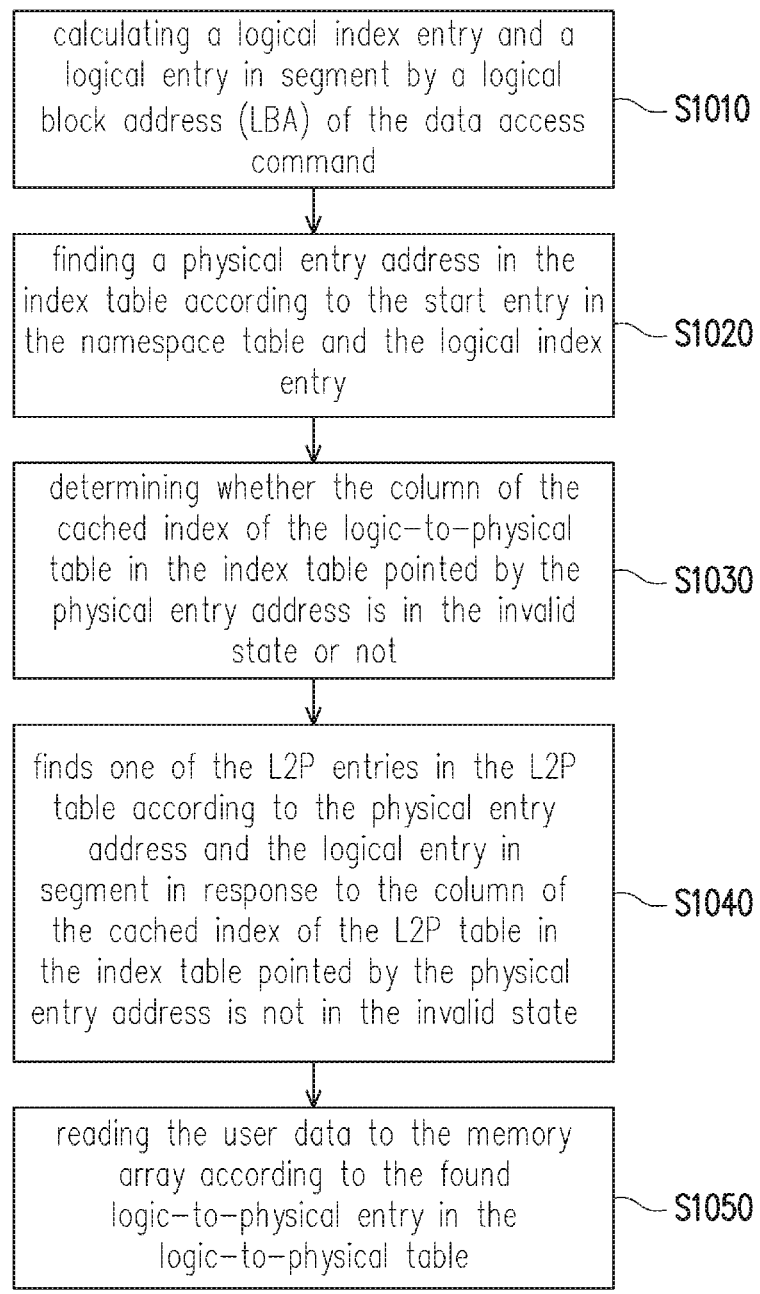
FIG. 10A and FIG. 10B are a flow chart and a schematic diagram for instruction "Read operation" of the memory device according to an embodiment of the present invention respectively.
Figure 10B:
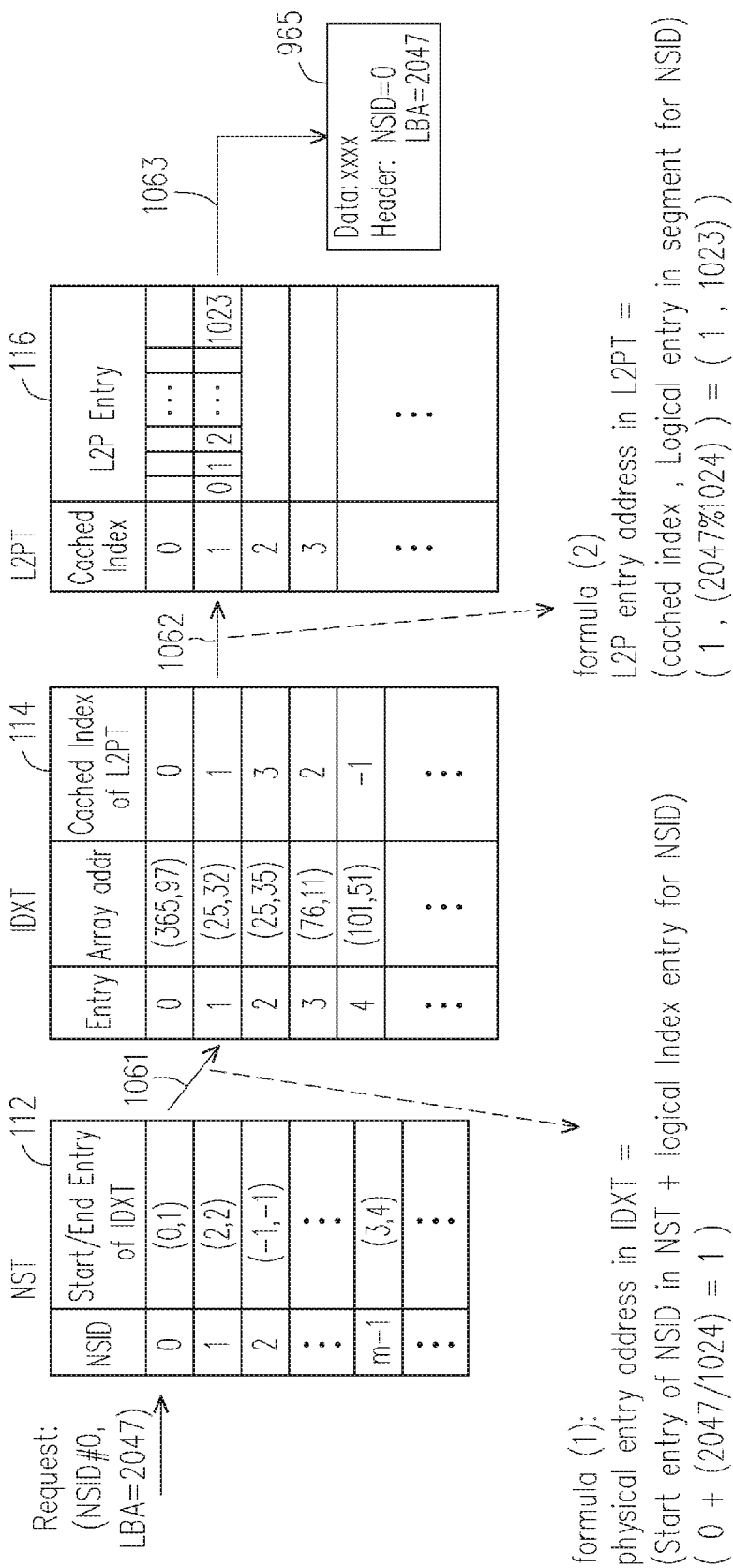

FIG. 10A and FIG. 10B are a flow chart and a schematic diagram for instruction "Read operation" of the memory device according to an embodiment of the present invention respectively. In FIG. 10A and FIG. 10B, the processor of the memory controller executes the data access command for reading a user data or an image data to a sixth NSID (i.e., the NSID "0") as follows. For example, in FIG. 10B, the sixth NSID "0" is set by command request from the host device 101 of FIG. 1.

In step S1010, the processor calculates a logical index entry and a logical entry in segment by a LBA of the data access command according to the sixth NSID in the namespace table. In the embodiment, the logical entry in segment of NSID "0" is "1023", and the logical index entry of NSID "0" is a quotient "1" for the LBA "2047" divided by "1024". In step S1020, the processor finds a physical entry address in the IDXT 114 according to the start entry "0" in the NST 112 and the logical index entry "1" shown as arrow 1061. Thus, the physical entry address in IDXT 114 is a number "1" for adding the start entry "0" of IDXT 114 and the logical index entry "1".

In step S1030, the processor determines whether the column of the cached index of the logic-to-physical table in the index table pointed by the physical entry address is in the invalid state or not. In step S1040, the processor finds one of the L2P entries in the logic-to-physical table according to the physical entry address "1" shown as arrow 1062 and the logical entry in segment which calculated at step S1010 in response to the column of the cached index of the L2PT 116 in the IDXT 114 pointed by the physical entry address is not in the invalid state. If it is valid state, the L2P entry can find by cache index of the L2PT and logical entry in segment. If cached index for the physical entry address is invalid state, load L2P entries to L2P table from memory array by NAND address of L2P table segment in IDXT is necessary, and related cached index become valid. In step S1050, the processor reads the user data from the memory array 106 according to the found L2P entry in the L2PT 116 shown as arrow 1063 and data block 965. In the data block 965, the data header information has information as "NSID=0" and "LBA=2047".

Figure 11A:
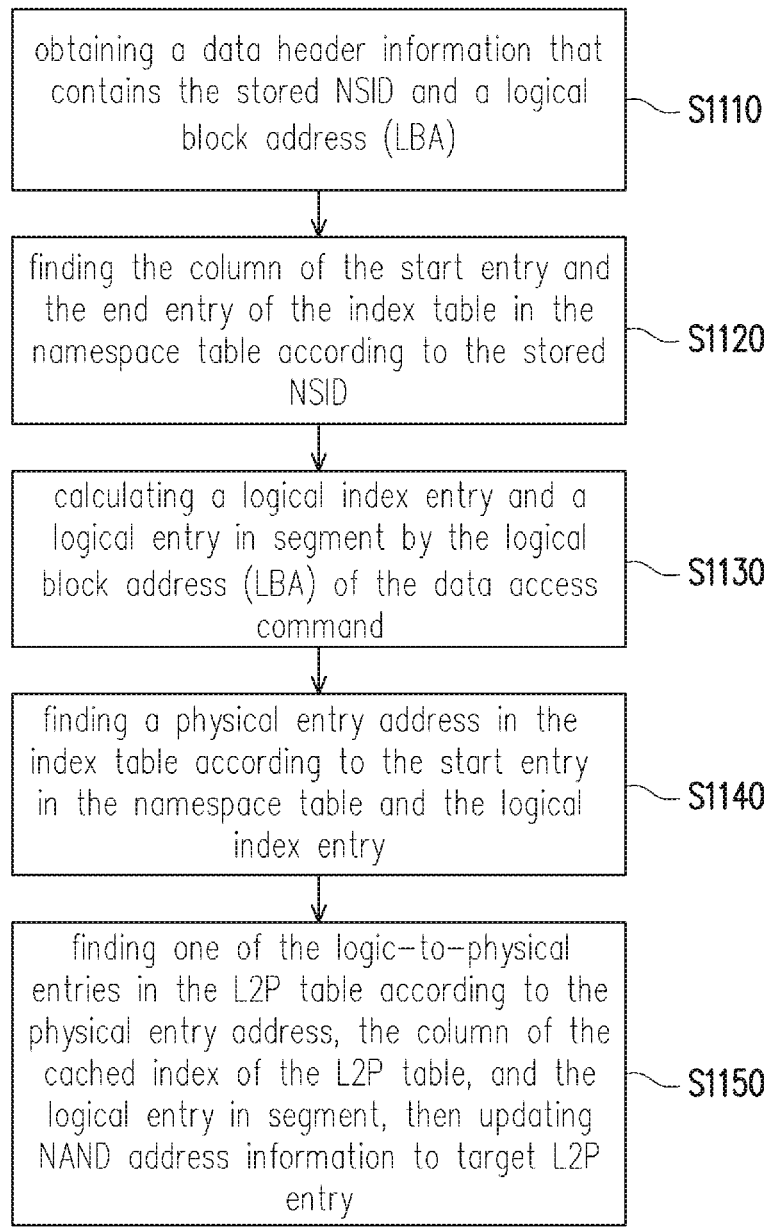
FIG. 11A and FIG. 11B are a flow chart and a schematic diagram for instruction "Rebuild L2PT by data" of the memory device according to an embodiment of the present invention respectively.
Figure 11B:
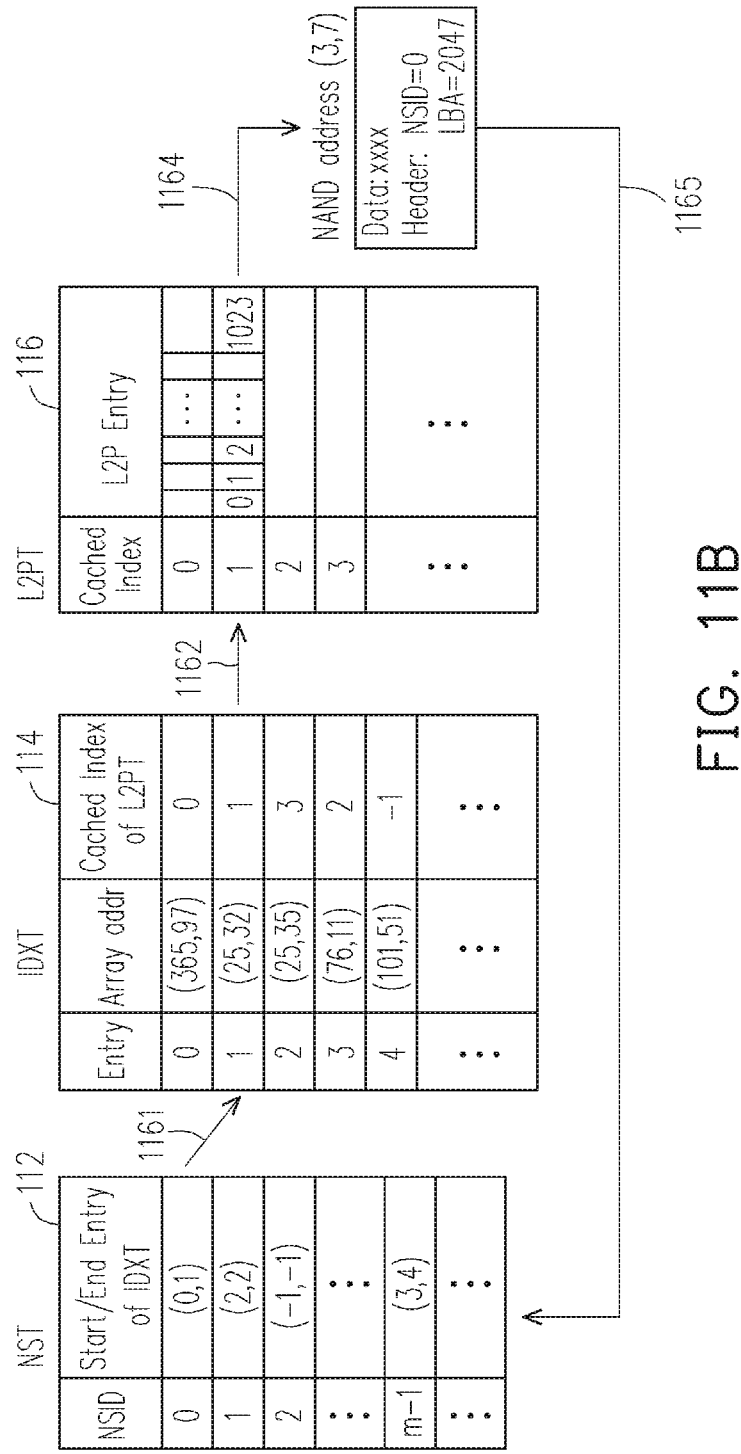

FIG. 11A and FIG. 11B are a flow chart and a schematic diagram for instruction "Rebuild L2PT by data" of the memory device according to an embodiment of the present invention respectively. In FIG. 11A and FIG. 11B, the processor of the memory controller executes the data access command for rebuild the L2PT to a stored NSID (i.e., the NSID "0") as follows. For example, in FIG. 11B, the stored NSID "0" is stored in the memory device.

In step S1110, the processor obtains a data header information that contains the stored NSID "0" and a LBA "2047" shown as arrow 1165. In step S1120, the processor finds the column of the start entry and the end entry (0, 1) of the IDXT 114 in the NST 112 according to the stored NSID "0". In step S1130, the processor calculates a logical index entry and a logical entry in segment by the LBA "2047" from the data header information. In the embodiment, the logical entry of NSID "0" is "0", and the logical index entry of NSID "0" is a quotient "1" for the LBA "2047" divided by "1024". In step S1140, the processor finds a physical entry address in the IDXT 114 according to the start entry "0" in the NST 112 and the logical index entry "1". The same as the above embodiment, the physical entry address in IDXT 114 is a number "1" for adding the start entry "0" of IDXT 114 and the logical index entry "1". In step S1150, the processor finds one of the logic-to-physical entries in the L2PT 116 according to the physical entry address "1", the column of the cached index of the L2PT 114 as shown by arrows 1162 and 1164, and the logical entry in segment. Then, the NAND address information (3, 7) is updated to target L2P entry.

Based on the foregoing, the memory device and the method for accessing therefore in the embodiments of the present invention are configured to manage data with namespace table and corresponding index table. If the data of the data access command that does not contain the NISD, the processor of the memory device can assign an internal NSID to the data for management easily, and it may not create another access method or mapping method to handle data that does not contain the NISD (i.e., an image data, such as, a firmware code, a boot partition, a replay protected memory block (RPMB), or an out-of-order data compared to user data).

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A memory device, comprising:
a memory array;
an internal memory, including a namespace table, an index table, and a logic-to-physical table, wherein the namespace table includes a plurality of namespace identifiers (NSIDs) and at least one internal NSID; and
a processor, coupled to the memory array and the internal memory,
wherein the processor is configured to:
obtaining a data access command from a host device to determine whether a data of the data access command contains one of the NSIDs;
assigning the at least one internal NSID to the data of the data access command according to the data access command in response to the data of the data access command that does not contain the namespace identifier; and
managing the data with the NSID and the data with the internal NSID by the namespace table and the index table,
wherein the namespace table includes a column of the NSIDs and a column of a start entry and an end entry of the index table,
the index table includes entries in a first column, addresses of the memory array for each entry in a second column, and cached indexes of the logic-to-physical table for each entry in a third column, and
the logic-to-physical table includes the cached indexes in a first column and the logic-to-physical entries for each of the cached indexes in a second column.

2. The memory device according to claim 1, wherein the data of the data access command that does not contain the namespace identifier is an image data for the memory device.

3. The memory device according to claim 2, wherein the image data is one of firmware code, a boot partition, a replay protected memory block (RPMB), and an out-of-order data compared to user data of the memory array.

4. The memory device according to claim 1, wherein the memory array includes a mapping table and a plurality of user data, and the user data contain the NSIDs.

5. The memory device according to claim 1, wherein the processor executes the data access command for creating a first NSID to perform steps for:
updating the start entry and the end entry of the index table in the first column with a creation preset value according to the first NSID in the namespace table, wherein the creation preset value is by command request from the host device;
setting a row or rows in the index table pointed by an updated data of the start entry and the end entry of the index table in the namespace table as an invalid state; and
flushing latest mapping data in the internal memory not store at the memory array yet to the memory array.

6. The memory device according to claim 1, wherein the processor executes the data access command for enlarging a second NSID to perform steps for:
flushing latest mapping data in the internal memory not store at the memory array yet to the memory array;
updating the start entry and the end entry of the index table with an enlargement size according to the second NSID in the namespace table, wherein the enlargement size is by command request from the host device and the enlargement size is larger than a size between the original entry and the original end entry of the index table;
arranging the entries in the index table according to the enlargement size, wherein an enlargement entry in the index table is set as an invalid state; and
flushing the latest mapping data in the internal memory not store at the memory array yet to the memory array.

7. The memory device according to claim 1, wherein the processor executes the data access command for narrowing a third NSID to perform steps for:
flushing latest mapping data in the internal memory not store at the memory array yet to the memory array;
updating the column of the start entry and the end entry of the index table with a narrowed size according to the third NSID in the namespace table, and updating all of the column of the start entry and the end entry of the index table, wherein the narrowed size is by command request from the host device and the narrowed size is smaller than a size between the original entry and the original end entry of the index table;
arranging the entries in the index table according to the narrowed size; and
flushing the latest mapping data in the internal memory not store at the memory array yet to the memory array.

8. The memory device according to claim 1, wherein the processor executes the data access command for deleting a fourth NSID to perform steps for:
flushing latest mapping data in the internal memory not store at the memory array yet to the memory array;
updating the column of the start entry and the end entry of the index table as an invalid state according to the fourth NSID in the namespace table, and updating all of the column of the start entry and the end entry of the index table;

arranging the entries in the index table according to the deleted fourth NSID; and flushing the latest mapping data in the internal memory not store at the memory array yet to the memory array.

9. The memory device according to claim 1, wherein the processor executes the data access command for writing a user data to a fifth NSID to perform steps for:

calculating a logical index entry and a logical entry in segment by a logical block address (LBA) of the data access command according to the fifth NSID in the namespace table, wherein the fifth NSID is set by the data access command;

finding a physical entry address in the index table according to the start entry in the namespace table and the logical index entry;

determining whether the column of the cached index of the logic-to-physical table in the index table pointed by the physical entry address is in the invalid state or not;

finding one of the logic-to-physical entries in the logic-to-physical table according to the physical entry address in response to the column of the cached index of the logic-to-physical table in the index table pointed by the physical entry address is not in the invalid state; and writing the user data to the memory array and update address of written memory array to the found logic-to-physical entry in the logic-to-physical table.

10. The memory device according to claim 1, wherein the processor executes the data access command for writing the data of the data access command that does not contain the namespace identifier to the internal NSID to perform steps for:

assigning the internal NSID to the image data for allocating the image data to a space of the internal NSID;

using the internal NSID to find the space in the memory space with the internal NSID according to the namespace table, the index table, and the logic-to-physical table, and writing the image data into the space in the memory array.

11. The memory device according to claim 1, wherein the processor executes the data access command for reading a user data to a sixth NSID to perform steps for:

calculating a logical index entry and a logical entry in segment by a LBA of the data access command according to the sixth NSID in the namespace table;

finding a physical entry address in the index table according to the start entry in the namespace table and the logical index entry;

determining whether the column of the cached index of the logic-to-physical table in the index table pointed by the physical entry address is in the invalid state or not;

finding one of the logic-to-physical entries in the logic-to-physical table according to the physical entry address and the logical entry in segment in response to the column of the cached index of the logic-to-physical table in the index table pointed by the physical entry address is not in the invalid state; and reading the user data to the memory array according to the found logic-to-physical entry in the logic-to-physical table.

12. The memory device according to claim 1, wherein the processor executes the data access command for rebuild the logical-to-physical table to a stored NSID to perform steps for:

obtaining a data header information that contains the stored NSID and a LBA;

finding the column of the start entry and the end entry of the index table in the namespace table according to the stored NSID;

calculating a logical index entry and a logical entry in segment by the LBA of the data access command;

finding a physical entry address in the index table according to the start entry in the namespace table and the logical index entry; and finding one of the logic-to-physical entries in the logic-to-physical table according to the physical entry address and the column of the cached index of the logic-to-physical table, then update data address information to the logic-to-physical entries.

13. The memory device according to claim 1, wherein the memory array is a flash memory array with a NAND type, a NOR type, or an AND type, wherein the internal memory is a dynamic random access memory (DRAM).

14. A method for accessing a memory device, wherein the memory device includes a memory array, an index table, and a logic-to-physical table, wherein the memory array includes a mapping table and a plurality of user data, and the user data contain the NSIDs, the method comprising:

obtaining a data access command from a host device to determine whether a data of the data access command contains one of the NSIDs;

assigning the at least one internal NSID to the data of the data access command according to the data access command in response to the data of the data access command that does not contain the namespace identifier; and managing the data with the NSID and the data with the internal NSID by the namespace table and the index table, wherein the namespace table includes a column of the NSIDs and a column of a start entry and an end entry of the index table, the index table includes entries in a first column, addresses of the memory array for each entry in a second column, and cached indexes of the logic-to-physical table for each entry in a third column;

the logic-to-physical table includes the cached indexes in a first column and the logic-to-physical entries for each of the cached indexes in a second column.

15. The method for accessing the memory device according to claim 14, wherein the data of the data access command that does not contain the namespace identifier is an image data for the memory device.

16. The method for accessing the memory device according to claim 15, wherein the image data is one of firmware code, a boot partition, a replay protected memory block (RPMB), and an out-of-order data compared to user data of the memory array.

17. The method for accessing the memory device according to claim 14, wherein when the data access command for creating a first NSID is executed, the method further includes:

updating the column of the start entry and the end entry of the index table with a creation preset value according to the first NSID in the namespace table, wherein the creation preset value is by command request from the host device;

setting a row or rows in the index table pointed by an updated data of the start entry and the end entry of the index table in the namespace table as an invalid state; and flushing latest mapping data in the internal memory not store at the memory array yet to the memory array.

18. The method for accessing the memory device according to claim 14, wherein when the data access command for enlarging a second NSID is executed, the method further includes:

flushing latest mapping data in the internal memory not store at the memory array yet to the memory array;

updating the column of the start entry and the end entry of the index table with an enlargement size according to the second NSID in the namespace table, wherein the enlargement size is by command request from the host device and the enlargement size is larger than a size between the original entry and the original end entry of the index table;

arranging the entries in the index table according to the enlargement size, wherein an enlargement entry in the index table is set as an invalid state; and flushing latest mapping data in the internal memory not store at the memory array yet to the memory array.

19. The method for accessing the memory device according to claim 14, wherein when the data access command for narrowing a third NSID is executed, the method further includes:

flushing latest mapping data in the internal memory not store at the memory array yet to the memory array;

updating the column of the start entry and the end entry of the index table with a narrowed size according to the third NSID in the namespace table, and updating all of the column of the start entry and the end entry of the index table, wherein the narrowed size is by command request from the host device and the narrowed size is smaller than a size between the original entry and the original end entry of the index table;

arranging the entries in the index table according to the narrowed size; and flushing the latest mapping data in the internal memory not store at the memory array yet to the memory array.

20. The method for accessing the memory device according to claim 14, wherein when the data access command for deleting a fourth NSID is executed, the method further includes:

flushing the index table with the memory array;

updating the column of the start entry and the end entry of the index table as an invalid state according to the fourth NSID in the namespace table, and updating all of the column of the start entry and the end entry of the index table;

arranging the entries in the index table according to the deleted preset NSID; and flushing latest mapping data in the internal memory not store at the memory array yet to the memory array.

21. The method for accessing the memory device according to claim 14, wherein when the data access command for writing a user data to a fifth NSID is executed, the fifth NSID is set by the data access command, the method further includes:

calculating a logical index entry and a logical entry in segment by a LBA of the data access command according to the fifth NSID in the namespace table;

finding a physical entry address in the index table according to the start entry in the namespace table and the logical index entry;

determining whether the column of the cached index of the logic-to-physical table in the index table pointed by the physical entry address is in the invalid state or not;

finding one of the logic-to-physical entries in the logic-to-physical table according to the physical entry address in response to the column of the cached index of the logic-to-physical table in the index table pointed by the physical entry address is not in the invalid state; and writing the user data to the memory array and update address of written memory array to the found logic-to-physical entry in the logic-to-physical table.

22. The method for accessing the memory device according to claim 14, wherein when the data access command for writing the data of the data access command that does not contain the namespace identifier to the internal NSID is executed, the method further includes:

assigning the internal NSID to the image data for allocating the image data to a space of the internal NSID;

using the internal NSID to find the space in the memory space with the internal NSID according to the namespace table, the index table, and the logic-to-physical table, and writing the image data into the space in the memory array.

23. The method for accessing the memory device according to claim 14, wherein when the data access command for reading a user data to a sixth NSID is executed, the method further includes:

calculating a logical index entry and a logical entry in segment by a LBA of the data access command;

finding a physical entry address in the index table according to the start entry in the namespace table and the logical index entry;

determining whether the column of the cached index of the logic-to-physical table in the index table pointed by the physical entry address is in the invalid state or not;

finding one of the logic-to-physical entries in the logic-to-physical table according to the physical entry address and the logical entry in segment in response to the column of the cached index of the logic-to-physical table in the index table pointed by the physical entry address is not in the invalid state; and reading the user data to the memory array according to the found logic-to-physical entry in the logic-to-physical table.

24. The method for accessing the memory device according to claim 14, wherein when the data access command for rebuild the logical-to-physical table is executed, the method further includes:

obtaining a data header information that contains a stored NSID and a LBA in the memory device;

finding the column of the start entry and the end entry of the index table in the namespace table according to the stored NSID;

calculating a logical index entry and a logical entry in segment by the LBA of the data access command;

finding a physical entry address in the index table according to the start entry in the namespace table and the logical index entry; and finding one of the logic-to-physical entries in the logic-to-physical table according to the physical entry address and the column of the cached index of the logic-to-physical table, then updating data address information to the logic-to-physical entries.

25. The method for accessing the memory device according to claim 14, wherein the memory array is a flash memory array with a NAND type, a NOR type, or an AND type, wherein the internal memory is a dynamic random access memory (DRAM).

* * * * *